United States Patent [19]
Kubo et al.

[11] Patent Number: 6,103,340
[45] Date of Patent: Aug. 15, 2000

[54] MAGNETIC RECORDING MEDIUM

[75] Inventors: Hiroki Kubo; Hideyuki Kobayashi; Kazutaka Yamashita, all of Tochigi-ken, Japan

[73] Assignee: Kao Corporation, Tokyo, Japan

[21] Appl. No.: 09/150,924

[22] Filed: Sep. 10, 1998

[30] Foreign Application Priority Data

Sep. 16, 1997 [JP] Japan ..................... 9-250729
Feb. 26, 1998 [JP] Japan ..................... 10-045066

[51] Int. Cl.$^7$ ......................................... G11B 5/70
[52] U.S. Cl. ..................... 428/141; 428/216; 428/323; 428/328; 428/694 BM; 428/694 BR; 428/900
[58] Field of Search ................... 428/141, 323, 428/216, 328, 694 BM, 694 BR, 900

[56] References Cited

FOREIGN PATENT DOCUMENTS 6-103562  4/1994  Japan .

*Primary Examiner*—Stevan A. Resan
*Attorney, Agent, or Firm*—Oblon, Spivak, McClelland, Maier & Neustadt, P.C.

[57] ABSTRACT

A magnetic recording medium comprising a nonmagnetic substrate having provided thereon an intermediate layer consisting essentially of magnetic powder having a Mohs hardness of not less than 3 and an average particle size of not greater than 0.5 $\mu$m and/or nonmagnetic powder having a Mohs hardness of not less than 3, carbon black, and a binder and, as a top layer, a magnetic layer consisting essentially of ferromagnetic metal powder and a binder, in which said magnetic layer has an average center-line surface roughness (Ra) of not greater than 7 nm, and said magnetic layer has an average center-line surface roughness (Ra) of 10 to 30 nm after being immersed in a hydrochloric acid aqueous solution for 24 hours.

5 Claims, No Drawings

MAGNETIC RECORDING MEDIUM

BACKGROUND OF THE INVENTION

1. Field of the Invention

The present invention relates to a magnetic recording medium and more particularly a high-density magnetic recording medium, which is required to have high storage stability, having a low surface resistivity.

2. Description of the Related Art

Low surface resistivity is particularly necessary for high-density magnetic recording media which are required to have long-term storage stability and reliability, such as magnetic tapes for computers.

Reduction of surface resistivity could easily be achieved by increasing the amount of carbon black, but a mere increase in the amount of carbon black causes deterioration of surface smoothness and electromagnetic conversion characteristics, thereby resulting in poor properties of the coating film, such as formation of streak lines.

In addition, a coating composition containing an increased amount of carbon black changes its characteristics during a coating operation, the coated film thus evincing film shows an increase in surface resistivity with time from the start to the end of the coating operation so that the resulting coated film has an unstable surface resistivity.

This is ascribable to structural change in the coating composition with time after addition of a hardener.

SUMMARY OF THE INVENTION

It is an object of the present invention is to provide a high-density magnetic recording medium which satisfies all the requirements of low surface resistivity, electromagnetic conversion characteristics, and storage stability without increasing the amount of carbon black present in the magnetic recording medium.

Applicants have found that the above object is achieved by controlling the surface profile of the magnetic layer of the magnetic recording medium so that the average center-line surface roughness (Ra) after acid immersion falls within the range of from 10 to 30 nm.

The present invention thus is directed to a magnetic recording medium comprising (a) a nonmagnetic substrate having provided thereon (b) an intermediate layer consisting essentially of (i) magnetic powder having a Mohs hardness of not less than 3 and an average particle size of not greater than 0.5 μm and/or nonmagnetic powder having a Mohs hardness of not less than 3, (ii) a carbon black, and (iii) a binder, and, (c) as a top layer, a magnetic layer consisting essentially of ferromagnetic metal powder and a binder, in which said magnetic layer has an average center-line surface roughness (Ra) of not greater than 7 nm, and said magnetic layer has an average center-line surface roughness (Ra) of 10 to 30 nm after being immersed in a hydrochloric acid aqueous solution for 24 hours.

According to the present invention, an increase in surface resistivity of the individual layers constituting a magnetic recording medium can thereby be suppressed without increasing carbon black content.

DETAILED DESCRIPTION OF THE INVENTION

The magnetic recording medium according to the present invention comprises a nonmagnetic substrate having provided thereon an intermediate layer and a magnetic layer as a top layer, in which the intermediate layer consists essentially of a magnetic powder having a Mohs hardness of not less than 3 and an average particle size of not greater than 0.5 μm and/or nonmagnetic powder having a Mohs hardness of not more than 3, carbon black, and a binder, and the magnetic layer consists essentially of a ferromagnetic metal powder and a binder.

The essential characteristics of the present invention are that the magnetic layer has an average center-line surface roughness Ra of not greater than 7 nm and has a center-line surface roughness Ra of 10 to 30 nm after the magnetic recording medium is treated with an acid aqueous solution (referred to as "Ra(CB)" hereinafter). Particularly, due to Ra(CB) being as defined an increase in surface resistivity with time is suppressed. The Ra(CB) is a measure indicating the extent of the three-dimensional network structure formed of the carbon black present in the coated film. On treating the magnetic recording medium with an aqueous solution of an acid (hereinafter simply referred to as an acid treatment), the magnetic powder and non-magnetic powder of the coated film is dissolved while the structure formed of carbon remains. Therefore, the surface profile after acid treatment reflects the structure formed of carbon black in the coated film. A post-acid treatment Ra (i.e., Ra after the acid treatment) falling within the above range indicates that carbon black forms an extensive three-dimensional network structure.

If the post-acid treatment Ra(CB) is less than 10 nm, it means that the extent of the three-dimensional network structure of carbon black is not sufficient for suppressing an increase in surface resistivity with time after coating. If the post-acid treatment Ra(CB) is more than 30 nm, a three-dimensional network structure is formed but the magnetic recording medium (before the acid treatment) has a large Ra exhibiting a reduced reproduction output. A preferred post-acid treatment Ra(CB) is 12 to 28 nm.

The acid treatment is carried out with use of a 1 to 3 N hydrochloric acid by immersing a sample at a temperature of 20 to 30° C. for 24 hours, whereby the surface profile attributed to the carbon black network structure is preferably measured. Where SEM observation is made to find that the magnetic powders or nonmagnetic powders are not sufficiently removed from the medium after it has been subjected to the acid treatment, the treatment time can be prolonged or the kind and concentration of the acid can be changed.

In order to obtain the Ra(CB) and Ra of the magnetic layer before the acid treatment, it is preferred that the three-dimensional network structure of carbon black is formed on the intermediate layer while the magnetic layer has a small three-dimensional network structure. The three-dimensional network structure can be formed on the intermediate layer by the following methods.

1) Carbon black having a pH of 8 or higher is incorporated into the intermediate layer in an amount of 30 to 150 parts by weight per 100 parts by weight of the total binders of the intermediate layer. After a magnetic layer is formed on the intermediate layer, the coated layer is dried by blowing with air at 40 to 900° C.

2) Carbon black having an average primary particle size of 30 to 80 nm and a DBP (dibutyl phthalate) oil absorption of not less than 300 ml/100 g is incorporated into the intermediate layer.

A combination of the above methods (1) and (2) is preferred.

In order to prevent any carbon black present in the magnetic layer from forming a three-dimensional network structure, the carbon black should have a pH of 7 or less or an oil absorption of not more than 150 ml/100 g.

The magnetic layer is usually provided as a top layer, i.e., a layer existing on the surface of the magnetic recording medium. This layer consists essentially of ferromagnetic metal powder and a binder and can be formed by using a magnetic coating composition comprising mainly ferromagnetic metal powder, a binder, and a solvent.

The ferromagnetic metal powder which can be used in the magnetic coating composition for forming the magnetic layer includes powder having a metal content of not less than 70% by weight, 60% by weight or more of which is Fe. Specific examples of such ferromagnetic metal powder includes Fe powder and powder of an Fe alloy, e.g., Fe—Co, Fe—Ni, Fe—Al, Fe—Ni—Al, Fe—Co—Ni, Fe—Ni—Al—Zn, and Fe—Al—Si.

The ferromagnetic metal powder comprising mainly Fe preferably has an acicular shape or a spindle shape, with its major axis preferably having a length of 0.05 to 0.25 $\mu$m, particularly 0.05 to 0.2 $\mu$m, its acicular ratio being preferably 2 to 20, its X-ray particle diameter being preferably 130 to 250 Å, and its specific surface area (BET) preferably ranging from 35 to 70 m$^2$/g, particularly 50 to 65 m$^2$/g.

The coercive force (Hc) of the ferromagnetic metal powder is preferably 115 to 210 kA/m, still preferably 125 to 200 kA/m. Within this range, RF outputs can be obtained over a full wavelength region with no excess nor shortage, and satisfactory overwrite characteristics are exhibited.

The saturation magnetization ($\sigma$s) of the ferromagnetic metal powder preferably ranges from 100 to 200 Am$^2$/kg, more preferably 120 to 170 Am$^2$/kg. Within this range, sufficient reproduction outputs are secured.

If desired, the ferromagnetic metal powder may contain rare earth elements or transition metal elements.

The magnetic coating composition for forming the magnetic layer may contain nonmagnetic powder and carbon black. The nonmagnetic powder and the carbon black which can be used in the magnetic layer can be selected from those useful in the intermediate layer hereinafter illustrated.

The binder which can be used in the magnetic coating composition forming the magnetic layer includes thermoplastic resins, thermosetting resins, and reactive resins, either individually or as a mixture thereof Examples of suitable binders are vinyl chloride resins, polyester, polyurethane, nitrocellulose, and epoxy resins. In addition, the resins described in Japanese Patent Laid-Open No. 162128/82, page 2, upper right column, line 19 to lower right column, line 19 can also be used. These binders can contain polar groups for improvement in dispersibility.

The binder is suitably used in an amount of from 5 to 200 parts by weight, preferably of from 5 to 70 parts by weight, per 100 parts by weight of the ferromagnetic metal powder.

The solvent which can be used in the magnetic coating composition for providing the magnetic layer includes ketones, esters, ethers, aromatic hydrocarbons, and chlorinated hydrocarbons. Specific examples of suitable solvents are given in Japanese Patent Laid-Open No. 162128/82, page, 3, lower right column, line 17 to page 4, lower left column, line 10.

The solvent is preferably used in an amount of 80 to 500 parts by weight, more preferably 100 to 350 parts by weight, per 100 parts by weight of the ferromagnetic metal powder.

If desired, the magnetic coating composition used for the formation of the magnetic layer may contain additives conventionally and generally used in magnetic recording media. Useful additives include dispersants, lubricants, abrasives, antistatic agents, rust inhibitors, antifungals or fungistats, and hardeners. Specific examples of useful additives are described in Japanese Patent Laid-Open No. 162128/82, page 2, lower left column, line 6 to lower right column, line 10 and page 3, lower left column, line 6 to upper right column, line 18.

The magnetic layer preferably has a thickness of 0.01 to 0.5 $\mu$m, preferably 0.05 to 0.3 $\mu$m. Within this range, the output stability and durability are well balanced.

The magnetic coating composition is prepared by, for example, preliminarily mixing the ferromagnetic metal powder and the binder together with a portion of the solvent in a Naughter mixer, etc., kneading the premixture in a continuous pressure kneader, etc., diluting the mixture with another portion of the solvent, followed by dispersing in a sand mill, etc., adding to the dispersion additives, such as a lubricant, filtering the dispersion, and adding thereto a hardener and the remainder of the solvent.

The rate of increase of surface resistivity of the magnetic layer can be expressed by the slope of log(R2) plots vs. T2, i.e., $\Delta$log(R2)/$\Delta$T2, wherein T2 is the time (hr) from addition of a polyisocyanate hardener to prepare the magnetic coating composition until application to a substrate, and R2 is the surface resistivity ($\Omega$/□) of a sample prepared by coating a substrate with the composition after T2. The $\Delta$log(R2)/$\Delta$T2 of the magnetic layer is desirably not more than 0.3 (1/hr). If it exceeds 0.3 (1/hr), the magnetic recording medium is liable to attract dust.

The intermediate layer which is provided beneath the magnetic layer may be either a magnetic layer or a nonmagnetic layer. The purpose of providing the intermediate layer is to improve magnetostatic characteristics and surface smoothness. Where the intermediate layer is a magnetic layer (hereinafter referred to as a magnetic intermediate layer), it is a magnetic layer containing magnetic powder which is formed by applying a magnetic coating composition comprising mainly magnetic powder having a Mohs hardness of not less than 3 and an average particle size of not greater than 0.5 $\mu$m, carbon black, a binder, and a solvent (hereinafter referred to as a magnetic intermediate coating composition). Where the intermediate layer is a nonmagnetic layer (hereinafter referred to as a nonmagnetic intermediate layer), it is a layer containing nonmagnetic powder which is formed by applying a nonmagnetic coating composition comprising mainly nonmagnetic powder having a Mohs hardness of not less than 3, carbon black, a binder, and a solvent (hereinafter referred to as a nonmagnetic intermediate coating composition).

The magnetic powder having a Mohs hardness of not less than 3 and an average particle size of not greater than 0.5 $\mu$m, which is used in the magnetic intermediate coating composition, preferably includes ferromagnetic powder. Either soft or hard magnetic powder can be used suitably. While the soft magnetic powder to be used is not particularly limited in kind, soft magnetic materials used in low-current devices, such as a magnetic head and an electron circuit, are preferred. For example, the soft magnetic materials described in Tikazumi Toshinobu, *Kyojiseitai no Buturi* (2nd Vol.) "*Jikitokusei to Ohyo*", pp. 368–376, Shokabo (1984) can be used. Soft magnetic oxide powder may be mentioned as a specific example.

The shape of the soft magnetic powder is not particularly limited and includes, for example, a spherical shape, a tabular shape, and an acicular shape. The particle size is preferably 5 to 800 nm.

On the other hand, the hard magnetic powder includes magnetic iron oxide powder, such as $\gamma$-Fe$_2$O$_3$ and Co-doped $\gamma$-Fe$_2$O$_3$, ferromagnetic metal powder consisting solely or mainly of iron, and hexagonal ferrite powder. Examples of the ferromagnetic metal powder useful in the magnetic intermediate layer are the same as those enumerated above for use in the above-described magnetic layer.

The magnetic iron oxide powder and the ferromagnetic metal powder consisting mainly of Fe preferably have an acicular shape or a spindle shape, with its major axis preferably having a length of 0.05 to 0.25 $\mu$m, particularly 0.05 to 0.2 $\mu$m, its acicular ratio being preferably 3 to 20, its X-ray particle diameter being preferably 0.5 $\mu$m or less, more preferably 130 to 250 A, and its specific surface area (BET) preferably ranging from 30 to 70 $m^2/g$.

The hexagonal ferrite powder includes fine tabular particles of barium ferrite or strontium ferrite, part of the Fe atoms of which may be displaced with Ti, Co, Ni, Zn, V or the like atoms. The hexagonal ferrite powder preferably has a tabular diameter of 0.02 to 0.09 $\mu$m, an aspect ratio of 2 to 7, and a specific surface area (BET) of 30 to 60 $m^2/g$.

The coercive force (Hc) of the hard magnetic powder is preferably 115 to 210 kA/m, more preferably 125 to 200 kA/m. Within this range, RF outputs can be obtained over a full wavelength region with no excess nor shortage, and satisfactory overwrite characteristics are exhibited.

The saturation magnetization ($\sigma$s) of the magnetic iron oxide powder and the ferromagnetic metal powder preferably ranges from 100 to 200 $Am^2/kg$, more preferably 120 to 170 $Am^2/kg$. That of the hexagonal ferrite powder is preferably 20 to 80 $Am^2/g$, particularly 30 to 70 $Am^2/kg$. Within these ranges, sufficient reproduction outputs are secured.

If desired, the magnetic powder in the magnetic intermediate coating composition may contain rare earth elements or transition metal elements. The same surface treatments as can be given to the magnetic powder of the magnetic layer can also be applied to the magnetic powder of the magnetic intermediate layer.

The magnetic intermediate coating composition contains carbon black. The carbon black preferably has a pH of 8 or higher. If the pH of the carbon black is lower than 8, an increase in surface resistivity with time cannot be suppressed. Such carbon black includes furnace black for rubber, thermal black for rubber, carbon black for colors, acetylene black, and Ketjen black, as disclosed in Carbon Black Binran, Carbon Black Kyokai (ed.). A preferred amount of carbon black in the range of from 2 to 20 parts by weight per 100 parts by weight of the total amount of the magnetic powder and the nonmagnetic powder, in which range an increase of surface resistivity with time can be satisfactorily suppressed.

The binder and solvent which can be used in the magnetic intermediate coating composition can be selected from those usable in the magnetic coating composition for the magnetic layer. The binder is preferably used in an amount of 5 to 200 parts by weight, more preferably 5 to 70 parts by weight, per 100 parts by weight of the total amount of the magnetic powder and nonmagnetic powder. The solvent is preferably used in an amount of 80 to 500 parts by weight, more preferably 100 to 350 parts by weight, per 100 parts by weight of the total amount of the magnetic powder and nonmagnetic powder.

If desired, the magnetic intermediate coating composition may contain various additives conventionally used in a magnetic coating composition for a magnetic layer. Further, the magnetic intermediate coating composition can contain nonmagnetic powder (hereinafter described) usable in the nonmagnetic intermediate coating composition for the nonmagnetic intermediate layer.

The magnetic intermediate layer preferably has a thickness of 0.2 to 5 $\mu$m, particularly 0.5 to 4 $\mu$m, especially 0.5 to 3.5 $\mu$m. The magnetic recording medium has sufficient bending stiffness with the intermediate layer having a thickness within this range.

The nonmagnetic powder having a Mohs hardness of not less than 3 which is used in the nonmagnetic intermediate layer includes particles of graphite, titanium oxide, barium sulfate, zinc sulfide, magnesium carbonate, calcium carbonate, zinc oxide, calcium oxide, magnesium oxide, magnesium dioxide, tungsten disulfide, molybdenum disulfide, boron nitride, tin dioxide, silicon dioxide, nonmagnetic chromium oxide, alumina, silicon carbide, cerium oxide, corundum, artificial diamond, nonmagnetic iron oxide, garnet, siliceous stone, silicon nitride, molybdenum carbide, boron carbide, tungsten carbide, titanium carbide, diatomaceous earth, dolomite, and resins. In particular, nonmagnetic iron oxide, titanium oxide, alumina, silicon dioxide, silicon nitride, and boron nitride are preferred. These nonmagnetic powders can be used either individually or as a combination of two or more thereof.

The nonmagnetic particles may have any of a spherical shape, a tabular shape, and an acicular shape or may be amorphous. Spherical, tabular, and amorphous nonmagnetic particles preferably have a particle size of 5 to 200 nm, and acicular particles preferably have a major axis length of 20 to 300 nm with an acicular ratio of 3 to 20.

For the purpose of improving dispersibility of the nonmagnetic powder, the nonmagnetic powder can be subjected to the same surface treatment as can be given to the ferromagnetic metal powder for use in the magnetic coating composition for the magnetic layer.

Carbon black which can be used in the nonmagnetic intermediate coating composition can be the same as useful in the magnetic intermediate coating composition for the magnetic intermediate layer. The carbon black is preferably used in an amount of 2 to 20 parts by weight per 100 parts by weight of the nonmagnetic powder, in which range an increase of surface resistivity with time can be satisfactorily supressed.

The binder and solvent which can be used in the nonmagnetic intermediate coating composition can be selected from those usable in the magnetic coating composition for the magnetic layer.

The binder is preferably used in an amount of 5 to 200 parts by weight, more preferably 5 to 70 parts by weight, per 100 parts by weight of the nonmagnetic powder.

The solvent is preferably used in an amount of 80 to 500 parts by weight, more preferably 100 to 350 parts by weight, per 100 parts by weight of the nonmagnetic powder.

If desired, the nonmagnetic intermediate coating composition may contain various additives conventionally used in a magnetic coating composition for a magnetic layer.

The nonmagnetic intermediate layer preferably has a thickness of 0.2 to 5 $\mu$m, particularly 0.5 to 4 $\mu$m, especially 0.5 to 3.5 $\mu$m. The magnetic recording medium has sufficient bending stiffness with the intermediate layer having a thickness within this range.

In the present invention, it is preferred for the intermediate layer by itself formed on a substrate has an average center-line surface roughness (Ra) of 10 to 30 nm after an acid treatment. An increase in surface resistivity with time after coating can thereby be suppressed. If the post-acid treatment Ra of the intermediate layer is less than 10 nm, it means that an increase in surface resistivity with time has not been suppressed. If the post-acid treatment Ra exceeds 30 nm, the Ra before the acid treatment must be also high, and the magnetic recording medium will have a reduced reproduction output.

The magnetic or nonmagnetic intermediate coating composition is prepared by, for example, preliminarily mixing the magnetic powder and/or nonmagnetic powder, the carbon black, and the binder together with a portion of the solvent in a Naughter mixer, etc., kneading the premixture in a continuous pressure kneader, etc., diluting the mixture with another portion of the solvent, followed by dispersing in a sand mill, etc., adding to the dispersion additives, such as a lubricant, filtering the dispersion, and adding thereto the hardener and the remainder of the solvent.

The rate of increase of surface resistivity of the intermediate layer can be expressed by the slope of log(R1) plots vs. T1, i.e., $\Delta\log(R1)/\Delta T1$, wherein T1 is the time (hr) from addition of a polyisocyanate hardener to prepare the intermediate coating composition until application to a substrate, and R1 is the surface resistivity ($\Omega/\square$) of a sample prepared by coating a substrate with the intermediate composition after T1. The $\Delta\log(R1)/\Delta T21$ of the intermediate layer is desirably not more than 0.3 (1/hr). If it exceeds 0.3 (1/hr), the magnetic recording medium is liable to attract dust.

The nonmagnetic substrate to be used in the present invention is not particularly limited, and any known nonmagnetic substrate can be used. Suitable nonmagnetic substrates include flexible films and disks made of a polymer and films, disks and cards made of nonmagnetic metal, e.g., Cu, Al or Zn, glass or ceramics, such as porcelain and pottery.

The polymer used for forming flexible films or disks includes polyethylene terephthalate, polyethylene naphthalate, and polyamide. These polymers can be used either individually or as a combination of two or more thereof The backcoat layer, which is provided on the back side of the nonmagnetic substrate if desired and/or necessary, can be formed by using any known backcoating composition with no particular limitation.

The magnetic recording medium of the present invention is suitable for use as magnetic tapes, such as an 8 mm video tape and a DAT tape. It is also useful in other types of magnetic recording media, such as floppy discs.

A process for producing the magnetic recording medium of the present invention will be briefly described. An intermediate coating composition forming an intermediate layer and a magnetic coating composition forming a magnetic layer are applied to a nonmagnetic substrate by simultaneous coating in a wet-on-wet coating system to form an intermediate layer and a magnetic layer having the respective desired dry thicknesses. That is, the magnetic layer is preferably formed when the intermediate layer is wet. A preferred coating speed is 100 to 600 m/min.

The coating film is then subjected to an orientation treatment in a magnetic field, dried, wound, and calendered. If desired, a backcoat layer is formed. If necessary, for example, in the production of magnetic tapes, the coated material is aged at 40 to 70° C. for 6 to 72 hours and then slit to a prescribed width.

The above-mentioned simultaneous coating technique in a wet-on-wet coating system is described, e.g., in Japanese Patent Laid-Open No. 73883/93, column 42, line 31 to column 43, line 31. This is a technique in which a magnetic coating composition for a magnetic layer is applied before an intermediate coating composition for an intermediate layer dries. Where this technique is adopted, the interface between the intermediate layer and the magnetic layer is smooth, and the magnetic layer has satisfactory surface properties. Thus, the resulting magnetic recording medium causes few dropouts and can cope with high-density recording, and the coating film (both the intermediate and magnetic layers) have excellent durability.

The magnetic field orientation treatment is performed before the intermediate coating composition and the magnetic coating compositions dry. In the production of a magnetic tape, for instance, the orientation treatment can be carried out by applying a magnetic field of about 40 kA/m or higher, preferably about 80 to 800 kA/m, in parallel with the coated side or passing the coated material through a solenoid type magnet of about 80 to 800 kA/m while the intermediate coating composition and the magnetic coating composition are wet.

The drying of the coating layer is conducted by, for example, supplying heated gas. The degree of drying can be controlled by adjusting the temperature and the feed rate of the gas. For example, the drying is preferably carried out by supplying hot air of 60 to 120° C. at a rate of 5 to 35 m/sec for 1 to 60 seconds.

The calendering of the coated material is carried out by, for example, supercalendering comprising passing the coated film between two rolls, such as a combination of a metal roll and a cotton roll or a synthetic resin roll, or a combination of two metal rolls.

If desired, the coated film can be subjected to a finishing step, such as polishing or cleaning of the surface of the magnetic layer. It is possible to form the intermediate layer and the magnetic layer by a known successive coating technique.

The present invention will now be illustrated in greater detail with reference to Examples as preferred embodiments of the invention. Parts referred to, unless otherwise indicated, are parts by weight.

EXAMPLES 1 TO 5 AND COMPARATIVE EXAMPLES 1 TO 4

Preparation of Coating Compositions:

The components shown in Tables 1 through 3 except a hardener were kneaded in a kneader, dispersed in a stirrer, and further finely dispersed in a sand mill. The dispersion was filtered through a 1 μm filter, and finally, a hardener was added thereto to prepare a magnetic coating composition and an intermediate coating composition.

TABLE 1

| Formulation of Magnetic Coating Composition (parts by wt.) | | |
|---|---|---|
| Component | Formulation A | Formulation B |
| Acicular ferromagnetic metal powder comprising mainly iron | 417 | 417 |
| Alumina powder (particle size: 0.2 to 0.3 μm) | 38 | 38 |
| Carbon black (pH 2; avg. primary particle size: 17 nm; oil absorption: 115 ml/100 g) | 0 | 42 |
| Carbon black (pH 8; avg. primary particle size: 17 nm; oil absorption: 68 ml/100 g) | 4 | 0 |
| Sulfonate-containing vinyl chloride resin | 67 | 67 |
| Sulfonate-containing urethane resin | 33 | 33 |
| Tridecyl stearate | 17 | 17 |
| Palmitic acid | 8 | 8 |
| Polyisocyanate hardener | 25 | 25 |
| Methyl ethyl ketone | 863 | 863 |
| Toluene | 863 | 863 |

TABLE 1-continued

Formulation of Magnetic
Coating Composition (parts by wt.)

| Component | Formulation A | Formulation B |
|---|---|---|
| Cyclohexanone | 286 | 286 |

TABLE 2

Formulation of Intermediate
Coating Composition (part by wt.)

| | Example No. | | | | |
|---|---|---|---|---|---|
| Component | 1 | 2 | 3 | 4 | 5 |
| Acicular α-$Fe_2O_3$ | 209 | 209 | 209 | 418 | 209 |
| Hexagonal barium ferrite primary particle size: 20 nm; BET: 60 $m^2$/g; Hc: 123.077 kA/m; σs: 46.6 $Am^2$/kg) | 209 | 209 | 209 | 0 | 0 |
| Hexagonal barium ferrite (primary particle size: 40 nm; BET: 35 $m^2$/g; Hc: 135.280 kA/m; σs: 58.0 $Am^2$/kg) | 0 | 0 | 0 | 0 | 209 |
| Alumina (median size: 0.3 μm) | 38 | 38 | 38 | 38 | 38 |
| Carbon black (pH 2; primary particle size: 16 nm; oil absorption: 115 ml/100 g) | 0 | 0 | 0 | 0 | 0 |
| Carbon black (pH 8; primary particle size: 17 nm; oil absorption: 68 ml/100 g) | 67 | 84 | 0 | 67 | 67 |
| Carbon black (pH 9; primary particle size: 30 nm; oil absorption: 300 ml/100 g) | 0 | 0 | 67 | 0 | 0 |
| Sulfonate-containing vinyl chloride resin | 67 | 67 | 67 | 67 | 67 |
| Sulfonate-containing urethane resin | 33 | 33 | 33 | 33 | 33 |
| Tridecyl stearate | 17 | 17 | 17 | 17 | 17 |
| Palmitic acid | 9 | 9 | 9 | 9 | 9 |
| Polyisocyanate hardener | 25 | 25 | 25 | 25 | 25 |
| Methyl ethyl ketone | 722 | 722 | 722 | 722 | 722 |
| Toluene | 668 | 668 | 668 | 668 | 668 |
| Cyclohexanone | 223 | 223 | 223 | 223 | 223 |
| Magnetic layer formulation | A | A | A | A | A |

TABLE 3

Formulation of Intermediate
Coating Composition (parts by wt.)

| | Comparative Example No. | | | |
|---|---|---|---|---|
| Component | 1 | 2 | 3 | 4 |
| Acicular α-$Fe_2O_3$ | 209 | 209 | 209 | 418 |
| Hexagonal barium ferrite (primary particle size: 20 nm; BET: 60 $m^2$/g; Hc: 123.077 kA/m; σs: 46.6 $Am^2$/kg) | 209 | 209 | 209 | 0 |
| Hexagonal barium ferrite (primary particle size: 40 nm; BET: 35 $m^2$/g; Hc: 135.280 kA/m; σs: 58.0 $Am^2$/kg) | 0 | 0 | 0 | 0 |
| Alumina (median size: 0.3 μm) | 38 | 38 | 38 | 38 |
| Carbon black (pH 2; primary particle size: 16 nm; oil absorption: 115 ml/100 g) | 67 | 126 | 33 | 67 |
| Carbon black (pH 8; primary particle size: 17 nm; oil absorption: 68 ml/100 g) | 0 | 0 | 0 | 0 |
| Carbon black (pH 9; primary particle size: 30 nm; oil absorption: 300 ml/100 g) | 0 | 0 | 0 | 0 |
| Sulfonate-containing vinyl chloride resin | 67 | 67 | 67 | 67 |
| Sulfonate-containing urethane resin | 33 | 33 | 33 | 33 |
| Tridecyl stearate | 17 | 17 | 17 | 17 |
| Palmitic acid | 9 | 9 | 9 | 9 |
| Polyisocyanate hardener | 25 | 25 | 25 | 25 |
| Methyl ethyl ketone | 722 | 722 | 722 | 722 |
| Toluene | 668 | 668 | 668 | 668 |
| Cyclohexanone | 223 | 223 | 223 | 223 |
| Magnetic layer formulation | A | A | B | A |

Preparation of Magnetic Recording Medium and Coated Samples:

A hardener was added to the magnetic coating composition and the intermediate coating composition. Three hours later, the intermediate coating composition and the magnetic coating composition were simultaneously applied onto a 6 μm thick polyethylene terephthalate substrate by means of a die coater to a coating thickness of 2.0 μm and 0.2 μm, respectively. The coated film was passed through a solenoid type magnet of 1.0 T while the magnetic layer was wet, dried in a drying oven by applying hot air at 50° C. at a rate of 10 m/min, and then calendered. The coated film was slit into strips of 8 mm in width to obtain an 8-mm video tape.

Separately, each composition was applied on the same substrate with a hand coater equipped with an applicator having a slot width of 40 μm to prepare a coated sample having only a magnetic layer or an intermediate layer. No orientation was carried out on these samples.

Evaluation of Physical and Performance Properties:

The average center-line surface roughness (Ra) of the magnetic recording medium (magnetic layer) before or after an acid treatment and the intermediate layer (of the sample comprising a substrate and an intermediate layer alone) before or after an acid treatment was measured in accordance with the method described below. In the acid treatment, the magnetic recording medium and the intermediate layer were immersed in 1N hydrochloric acid at 25° C. for 24 hours, rinsed well with distilled water, and dried, and the surface of the coated side was observed under a scanning electron micrograph to confirm dissolution of the ferromagnetic metal powder and inorganic powder (except alumina and carbon black).

The surface resistivity of the magnetic recording medium (magnetic layer), the intermediate layer, and those prepared by using the respective coating compositions having been left to stand for 30 minutes and 3 hours after the addition of a hardener was measured according to the following method. The rate of increase in resistivity with time in the magnetic recording medium (magnetic layer) and the intermediate layer was calculated from the results of measurement.

The reproduction output, dust attractiveness, and the number of streak lines of the magnetic recording medium were measured according to the following methods. Further, the thixotropy of the intermediate coating composition was measured according to the following method. The results obtained are shown in Table 4 below.

1) Average Center-line Surface Roughness (Ra):

Measured with Laser Interferometric Microscope Maxim 3D Model 5700 (manufactured by Zygo) under the following conditions.

| | |
|---|---|
| Lens | Fizeau x40 |
| Remove | Cylinder (a treatment to remove the waviness of low frequency by assuming a sample to have a cylindrical curved surface) |
| Filter | off |
| Sampling length | 180 nm |
| Number of samples | 260 |

2) Surface Resistivity:

A voltage of 500 V was applied to the magnetic layer side, and the surface resistivity after 1 minute from the voltage application was measured with R8340 manufactured by Advantest at 20° C. and 50% RH.

3) Dust Attraction Test:

A magnetic recording medium prepared by using an intermediate coating composition having been left to stand for 3 hours after addition of a hardener was used as a test sample. The sample was run on a drive for 1000 passes under the environment of Class 100,000 of Federal Standard 209D (Clean Room and Work Station Requirements Controlled Environments) and taken out. Randomly chosen 5 positions of the magnetic layer side were observed under an optical microscope at 200 magnifications, and the number of dust particles of 5 µm or greater present in an area of 1 cm$^2$ per position was counted. The average of the 5 counts was taken as a measure of dust attractiveness of the sample.

4) Streak Lines:

A stock roll of a coated film was sampled at the core, middle and outer part of the roll, and the number of streak lines per sheet sample was counted with the naked eye. The average of the 3 counts was taken as the number of steak lines of the sample.

5) Thixotropy:

Measured with a Brookfield viscometer at a rotational speed of 20 rpm and 100 rpm. Thixotropy was expressed in terms of 20 rpm/100 rpm ratio of the viscosity.

dust attractiveness and streak lines of the magnetic recording medium, and thixotropy of the intermediate coating composition were within acceptable ranges. To the contrary, in Comparative Examples 1 to 4 the increase in surface resistivity of the intermediate layer with time cannot be suppressed. In particular, the sample of Comparative Example 2 is inferior in Ra (of the magnetic recording medium), reproduction output, streak lines of the magnetic recording medium and thixotropy of the intermediate coating composition; and the sample of Comparative Example 3 suffers from an increase in surface resistivity of not only the intermediate layer but the magnetic layer with time and is inferior in Ra (of the magnetic recording medium), reproduction output and dust non-attractiveness.

This application is based on Japanese Patent Application Nos. 9-250729 and 10-45066, filed Sep. 16, 1997 and Feb. 26, 1998 respectively, the entire content thereof being incorporated by references.

What is claimed is:

1. A magnetic recording medium comprising a nonmagnetic substrate having provided thereon an intermediate layer consisting essentially of magnetic powder having a Mohs hardness of not less than 3 and an average particle size of not greater than 0.5 µm and/or nonmagnetic powder having a Mohs hardness of not less than 3, carbon black, and a binder and, as a top layer, a magnetic layer consisting essentially of ferromagnetic metal powder and a binder, in which said magnetic layer has an average center-line surface roughness (Ra) of not greater than 7 nm, and said magnetic layer has an average center-line surface roughness (Ra) of 10 to 30 nm after being immersed in a hydrochloric acid aqueous solution for 24 hours.

2. The magnetic recording medium according to claim 1, wherein said intermediate layer has an average center-line surface roughness (Ra) of 10 to 30 nm when formed by itself on said nonmagnetic substrate and immersed in the hydrochloric acid aqueous solution.

3. The magnetic recording medium according to claim 1, wherein the average center-line surface roughness (Ra) is 12 to 28 nm after being immersed in the acid aqueous solution for 24 hours.

TABLE 4

| | Example No. | | | | | Comparative Example No. | | | |
|---|---|---|---|---|---|---|---|---|---|
| | 1 | 2 | 3 | 4 | 5 | 1 | 2 | 3 | 4 |
| Ra (nm) of magnetic recording medium after acid treatment | 10.3 | 12.1 | 21.0 | 10.4 | 16.0 | 7.1 | 9.2 | 9.7 | 7.1 |
| Ra (nm) of intermediate layer after acid treatment | 10.1 | 12.2 | 22.0 | 10.0 | 15.8 | 7.0 | 9.1 | 9.1 | 7.0 |
| Initial surface resistivity of magnetic recording medium (Ω/□) | 1.0E + 06 | 1.3E + 06 | 5.0E + 05 | 1.0E + 06 | 8.0E + 06 | 1.4E + 07 | 8.0E + 06 | 1.2E + 08 | 1.4E + 07 |
| Surface resistivity after 3 hrs* (Ω/□) | 7.9E + 06 | 5.2E + 06 | 8.5E + 05 | 9.7E + 06 | 9.7E + 06 | 1.4E + 10 | 2.0E + 07 | 3.8E + 12 | 1.5E + 10 |
| Rate of surface resistivity increase of intermediate layer (1/hr) | 0.3 | 0.2 | 0.2 | 0.3 | 0.3 | 1.0 | 0.4 | 1.5 | 1.0 |
| Rate of surface resistivity increase of magnetic layer (1/hr) | 0.1 | 0.1 | 0.1 | 0.1 | 0.1 | 0.1 | 0.1 | 0.7 | 0.1 |
| Ra (nm) of magnetic recording medium | 6.0 | 6.6 | 6.3 | 6.2 | 6.1 | 6.1 | 8.3 | 7.9 | 6.1 |
| Reproduction output (%) | 110 | 110 | 110 | 100 | 110 | 100 | 85 | 86 | 100 |
| Dust attractiveness (/cm$^2$) | 2 | 1 | 2 | 3 | 7 | 10 | 3 | 30 | 10 |
| Number of steak lines | 0 | 0 | 0 | 0 | 0 | 2 | 6 | 3 | |
| Thixotropy of intermediate coating composition (20 rpm/100 rpm) | 1.8 | 1.8 | 2.0 | 1.8 | 1.7 | 1.7 | 3.2 | 1.7 | 1.7 |

Note:
*The surface resistivity of a magnetic recording medium prepared by using the intermediate coating composition and the magnetic coating composition after 3 hours after addition of a hardener to the respective coating compositions.

As is apparent from the results in Table 4, in Examples 1 to 5 the increase in surface resistivity of the intermediate layer and the magnetic layer with time can be suppressed, and the results of evaluations of Ra, reproduction output, 4. The magnetic recording medium according to claim 1, wherein the magnetic layer has a thickness of 0.05 to 0.3 µm, and the intermediate layer has a thickness of 0.2 to 5 µm, the intermediate layer being a magnetic layer.

5. The magnetic recording medium according to claim 4, wherein the carbon black present in the intermediate layer is present in an amount of from 2 to 20 parts by weight per 100 parts by weight of the total amount of the magnetic powder and the non-magnetic powder.

* * * * *